United States Patent Office 2,850,335
Patented Sept. 2, 1958

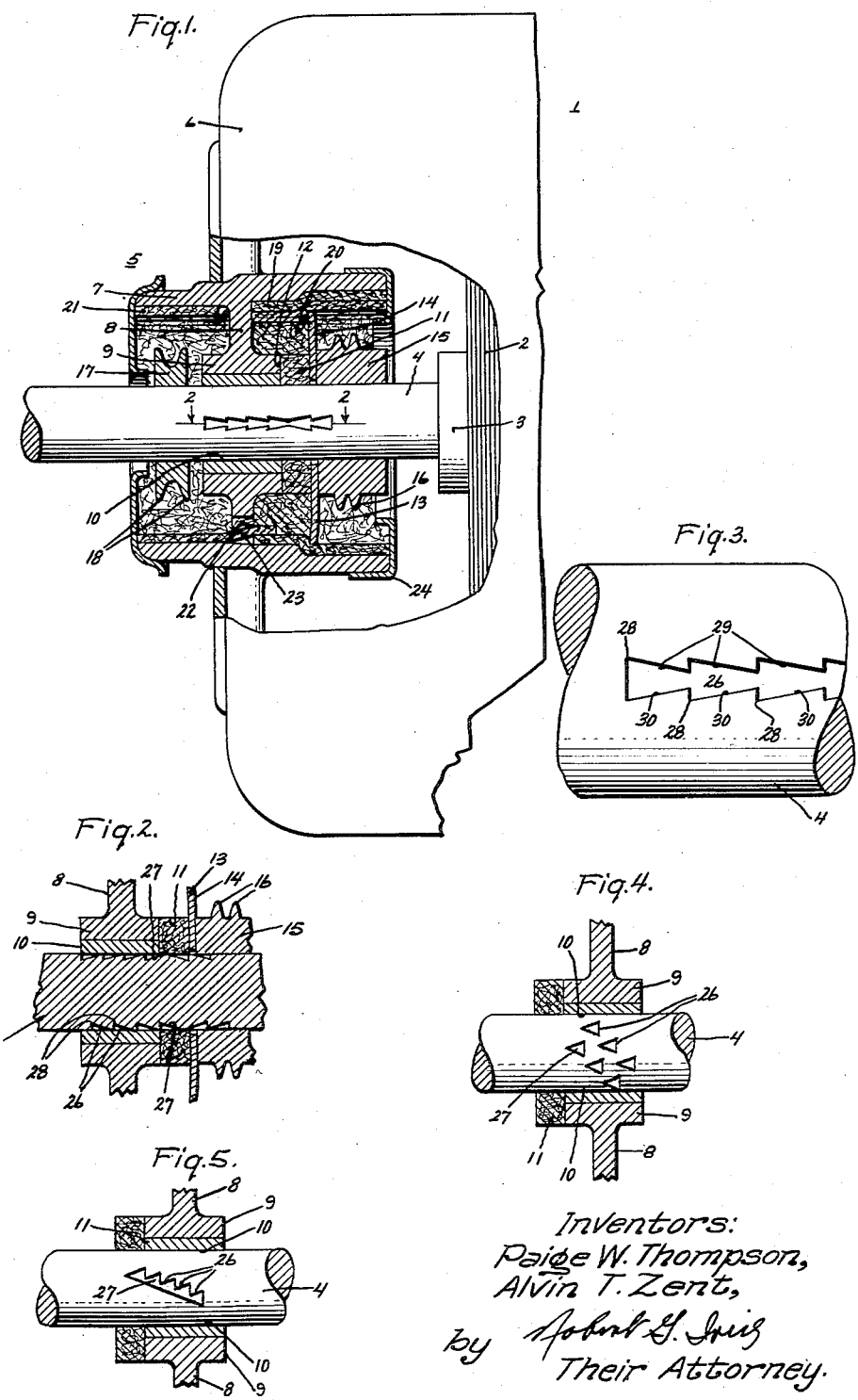

2,850,335

BEARING CONSTRUCTION

Paige W. Thompson, Fort Wayne, and Alvin T. Zent, Huntington, Ind., assignors to General Electric Company, a corporation of New York Application November 14, 1955, Serial No. 546,339

7 Claims. (Cl. 308—121)

This invention relates to bearing structures, and more particularly to improved lubricating arrangements for bearings which are to support shafts rotatable in both directions.

There are a great many applications where machines, such as dynamoelectric machines, for instance, are required to be rotatable in either direction. In such cases, the problem arises of providing a positive supply of lubricant to the bearings which support the shaft in the simplest and most economical manner possible. While there are many methods of providing positive lubrication even where the shaft is so rotatable, they generally involve considerable modification of the bearing structure itself with a consequent increase in the expense of the bearing. It is most desirable to maintain the construction of bearings for shafts rotatable in both directions as close as possible to that of bearings for shafts rotatable in a single direction thereby providing increased economy in the manufacture of such bearings.

It is, therefore, an object of this invention to provide an improved bearing structure for the support of reversible shafts which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broader aspects, the invention provides a rotatable shaft in combination with a bearing therefor. The bearing includes a sleeve member which is in contact with an axial portion of the shaft for rotatably supporting the same, and wicking means in contact with the surface of the shaft adjacent the sleeve member. Either the sleeve member or the shaft portion is provided with a wedge shaped recess, with the large end of the recess formed away from the wicking means and the small end of the recess positioned adjacent the wicking means. The recess is preferably formed to be substantially symmetrical about a line parallel to the axis of rotation. With this construction, one side of the wedge acts to provide a positive force on lubricant caught in the wedge to force it away from the wicking means no matter what the direction of rotation.

In the drawing, Figure 1 is a fragmentary side view, partly broken away and partly in cross section, of a dynamoelectric machine having the improved shaft bearing construction of this invention;

Figure 2 is a view along line 2—2 of Figure 1;

Figure 3 is an enlarged fragmentary view of a portion of Figure 1;

Figure 4 is a fragmentary side view, partly in cross section, of a second embodiment of the invention; and Figure 5 is a fragmentary side view, partly in cross section, of yet another modified embodiment of this invention.

Referring now to Figures 1, 2 and 3 of the drawing, there is shown a dynamoelectric machine 1 having a rotor member 2 normally formed of a stacked plurality of thin laminations of magnetic material. Rigidly secured to and concentric with rotor member 2 is a shaft member 3 having a portion 4 rotatably supported by a bearing 5 rigidly secured within housing 6 of the machine. Bearing 5 includes an outer hollow portion 7 which is connected by a spider 8 to a sleeve member 9 having a bearing surface 10. A washer shaped wicking member 11 of absorbent material is arranged at end 12 of sleeve 9 in contact with shaft portion 4; at the other side of the wicking member there is provided a disc 13. Surface 14 of disc 13 is in contact with the surface of lubricant slinger member 15 which is rigidly secured to shaft portion 4 so as to constitute a radial surface thereon and is provided with peripheral ridges 16. A similar lubricant slinger member 17 having peripheral ridges 18 is secured to shaft portion 4 at the other side of bearing sleeve 9. An annulus 19 of absorbent material is secured to the inner surface of bearing portion 7 and is arranged to secure disc 13 to preclude it from rotating with slinger member 15.

Lubricant slung from ridges 16 of member 15 is absorbed by annulus 19 and conducted back through a mass 20 of absorbent material to the wicking member 11. In similar fashion, an annulus 21 of absorbent material is provided around the inner surface of member 7 in axial alignment with slinger member 17 so as to receive the lubricant slung from ridges 18 and guide it back through openings 22 in spider member 8 by means of fingers 23 which extend into contact with mass 20 of absorbent material. Annulus 19 is maintained in position by a retainer member 24 and a similar member 25 is provided for annulus 21.

When shaft 3 rotates, bearing sleeve surface 10 receives the radial load of the bearing while the thrust load is transmitted between disc 13 and lubricant slinger member 15. It is necessary that a positive supply of lubricant be provided to both the bearing areas described, and to achieve that purpose the structure now to be described is provided. A series of wedge shaped recesses 26 which may, as shown, be joined together by dovetailing if so desired, are formed in the surface of shaft portion 4 so as to extend in an axial direction. The large ends of the first wedge 27 and all the subsequent wedges 26 are positioned remote from the wicking member 11. The small end of the first wedge 27 is arranged adjacent wicking member 11, and the small ends of the other wedges 26 are arranged toward the wicking member, as shown. As can best be seen in Figure 2, the wedge shape is preferably provided not only in width but also in depth. In addition, it is desirable to provide a second line of wedge shaped recesses 26 and 27 diametrically opposite the first group with their wide extremities 28 arranged so that each one is approximately in the same radial plane as the axial center of one of the recesses of the other group, i. e., the ends of the two groups of recesses are axially offset.

When shaft 3 rotates clockwise, as viewed from the left end in Figures 1, 2 and 3, side 29 of each recess will be effective to force lubricant away from the wick; those extending to the left force the lubricant across the sleeve bearing surface, while in the case of the thrust bearing arrangement the lubricant is forced toward the thrust bearing surface. When the direction of rotation is reversed, side 30 of each recess becomes effective to pump the lubricant away from the wicking member. When the lubricant reaches the end of each recess, part of it will pass into the next recess 26 where the action will be repeated. However, part of it will be forced out of the recess and on to the surface of the shaft. In this case, when the opposite group of recesses 26 rotate into position to pick up the lubricant which was forced out of the ends of the first group of recesses, they will then move the lubricant further along the shaft since they pick it up at about the midpoint of each recess. In this manner, part of the lubricant will be forced across the entire surface to be lubricated and part will be forced to the point where it can be fed across the thrust bearing surface. The fact that the bottom of each recess is also wedge shaped assists in the action of forcing the lubricant away from the wicking member regardless of the particular direction of rotation.

It will be seen that during clockwise rotation, as viewed from the left end in Figure 1, side 30 of each recess will be ineffective to pump lubricant, and during counter-clockwise rotation side 29 of each recess will be ineffective. Thus, no matter which direction of rotation is required of shaft 3, one side will be effective to pump lubricant, assisted by the bottom of the recess, while the other side of the recess will in no way detract from that pumping action.

Referring now to Figure 4 of the drawing, there is shown a second embodiment of the invention, which will be described using like numerals for like parts. In lieu of a row of recesses 26 and 27 dovetailed into each other, the embodiment of Figure 3 provides a group of recesses 26 and 27 which are circumferentially removed from each other, and are, preferably, axially overlapping as shown. The effect is approximately the same, with the primary difference lying in the manufacturing preference.

Referring now to Figure 5 of the drawing, yet a third embodiment of the invention is set forth. In this case, the first recess 27 and the other recesses 26 are joined in a manner similar to that of Figure 1 but are formed in a line which is slanted to the axis of the shaft 3 so as to be substantially helical. A similarly arranged line of recesses may be provided on the other side of the shaft in a manner similar to that of the embodiment of Figure 1.

It will be observed that all three of these embodiments achieve a positive pumping effect regardless of direction of rotation in substantially the same manner and that a considerable number of variations of the basic idea of this invention may be utilized. Thus, the wedge shaped recesses may be provided connected to each other or individually, and in any desired pattern so as to achieve a pumping effect from the wicking member and across the surface where positive lubrication is desired. In addition, it will be understood that while a particular type of bearing has been shown, that is, one in which the wicking means is provided at an end of the bearing sleeve, the invention is not so restricted, but may be utilized with wicking means provided in other locations relative to the bearing sleeve with equal success, the important feature lying in the fact that the large end of each wedge is arranged away from the wicking member with the small end of the wedge toward the wicking member so that the pumping effect will always be away from the wicking member.

Thus, while the invention has been explained by describing a particular embodiment thereof, it will be apparent that improvements and modifications may be made without departing from the scope of the invention as defined in the appended claims.

What we claim as new and desire to secure by Letters Patent of the United States is:

1. In combination, a rotatable shaft and a bearing therefor comprising a sleeve member in contact with an axial portion of said shaft for rotatably supporting the same, and wicking means in contact with the surface of said shaft adjacent said sleeve member, one of said sleeve member and said shaft portion having a plurality of distinctly defined axially overlapping axially extending wedge shaped recesses formed therein, each of said recesses having mutually diverging side walls and each of said recesses being formed with the large end thereof away from said wicking means and the small end thereof toward said wicking means, at least one of said recesses being nearer said wicking means than another of said recesses, the recess nearest said wicking means having its small end adjacent thereto.

2. In combination, a rotatable shaft and a bearing therefor comprising a sleeve member in contact with an axial portion of said shaft for rotatably supporting the same, and wicking means in contact with the surface of said shaft adjacent said sleeve member, said shaft portion having a plurality of distinctly defined axially overlapping axially extending wedge shaped recesses formed therein, each of said recesses having mutually diverging side walls and each of said recesses being formed with the large end thereof away from said wicking means and the small end thereof toward said wicking means, at least one of said recesses having its small end adjacent said wicking means and located nearer said wicking means than another of said recesses.

3. In combination, a rotatable shaft and a bearing therefor comprising a sleeve member in contact with an axial portion of said shaft for rotatably supporting the same, and wicking means in contact with the surface of said shaft adjacent said sleeve member, said shaft portion having two groups of axially extending dovetailed wedge shaped recesses formed therein with the large end of each said recess away from said wicking means and the small end of each said recess toward said wicking means, at least one of said recesses having its small end adjacent said wicking means, the ends of the recesses of the first of said groups being axially offset from the ends of the recesses of the second of said groups.

4. In combination, a rotatable shaft and a bearing therefor comprising a sleeve member in contact with an axial portion of said shaft for rotatably supporting the same, and wicking means in contact with the surface of said shaft adjacent said sleeve member, said shaft portion having a plurality of distinctly defined axially overlapping axially extending circumferentially displaced wedge shaped recesses formed therein, each of said recesses having mutually diverging side walls and each of said recesses being formed with the large end thereof away from said wicking means and the small end thereof toward said wicking means, at least one of said recesses having its small end adjacent said wicking means and located nearer said wicking means than another of said recesses.

5. In combination, a rotatable shaft and a bearing therefor comprising a sleeve member in contact with an axial portion of said shaft for rotatably supporting the same, and wicking means in contact with the surface of said shaft adjacent said sleeve member, said shaft portion having two helically extending groups of axially extending wedge shaped distinctly defined recesses, each formed with the large end of the recess away from said wicking means and the small end of said recess toward the wicking means, the ends of the recesses of the first of said groups being axially offset from the ends of the recesses of the second of said groups, at least one of said recesses having its small end adjacent said wicking means and each of said recesses having mutually diverging side walls.

6. In combination, a rotatable shaft and a bearing therefor comprising a sleeve member in contact with an axial portion of said shaft for rotatably supporting the same, wicking means in contact with the surface of said shaft against one end of said sleeve member, and a thrust bearing surface on the other side of said wicking means in contact with a radial portion of said shaft, said axial shaft portion having a plurality of distinctly defined axially overlapping axially extending wedge shaped recesses formed therein, each of said recesses having mutually diverging side walls and said recesses extending in both directions away from said wicking means with the large end of each recess formed away from said wicking means and the small end of each recess toward said wicking means, at least one recess of each said group having its small end adjacent said wicking means.

7. In combination, a rotatable shaft and a bearing therefor comprising a sleeve member in contact with an axial portion of said shaft for rotatably supporting the same, and wicking means in contact with the surface of said shaft adjacent said sleeve member, said shaft portion having formed therein a plurality of axially overlapping axially extending recesses respectively having their sides and bottoms formed in the shape of wedges, the large end of each said recess being formed away from said wicking means and the small end of each said recess being formed toward said wicking means, at least one of said recesses having its small end adjacent said wicking means.

References Cited in the file of this patent

UNITED STATES PATENTS

| | | |
|---|---|---|
| 2,510,549 | Buchi | June 6, 1950 |
| 2,598,476 | Wightman | May 27, 1952 |
| 2,752,208 | Wightman | June 26, 1956 |